A. KAPLAN.
SHIP'S BALLASTING APPARATUS.
APPLICATION FILED APR. 23, 1915.
1,154,515.
Patented Sept. 21, 1915.
2 SHEETS—SHEET 1.
Fig. 1.
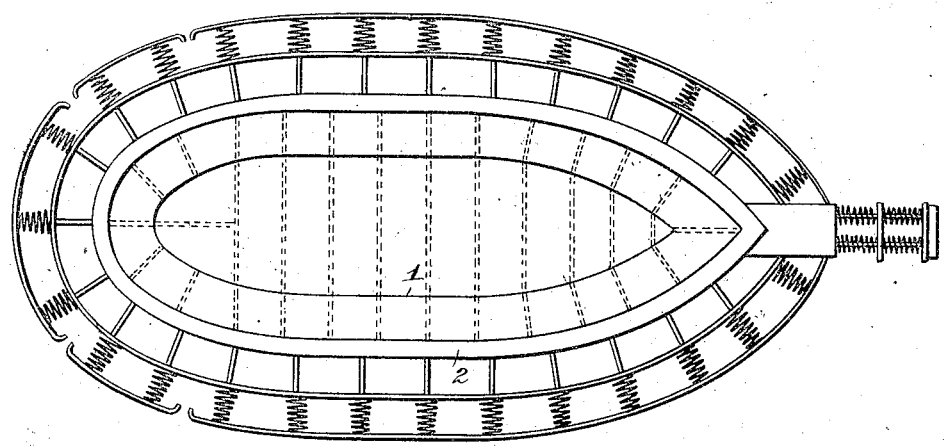
Fig. 2.
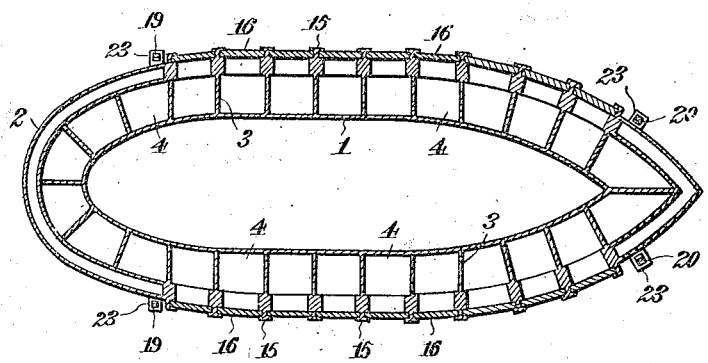
Fig. 5.
Fig. 6.
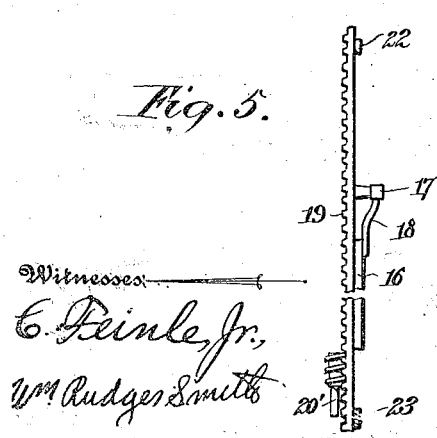
Witnesses
E. Peinle, Jr.
Wm Rudger Smith
Inventor
Abraham Kaplan
By Victor J. Evans,
Attorney

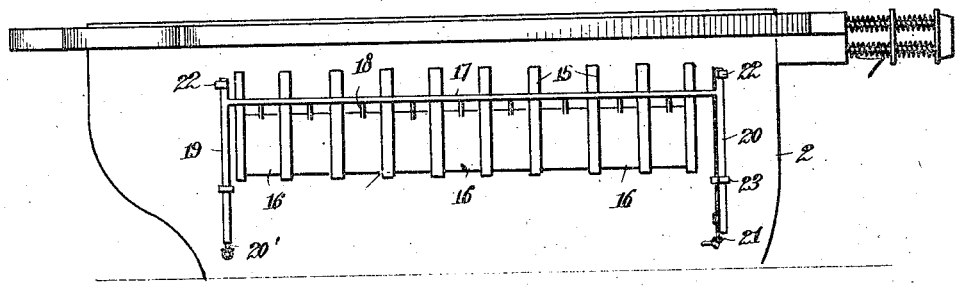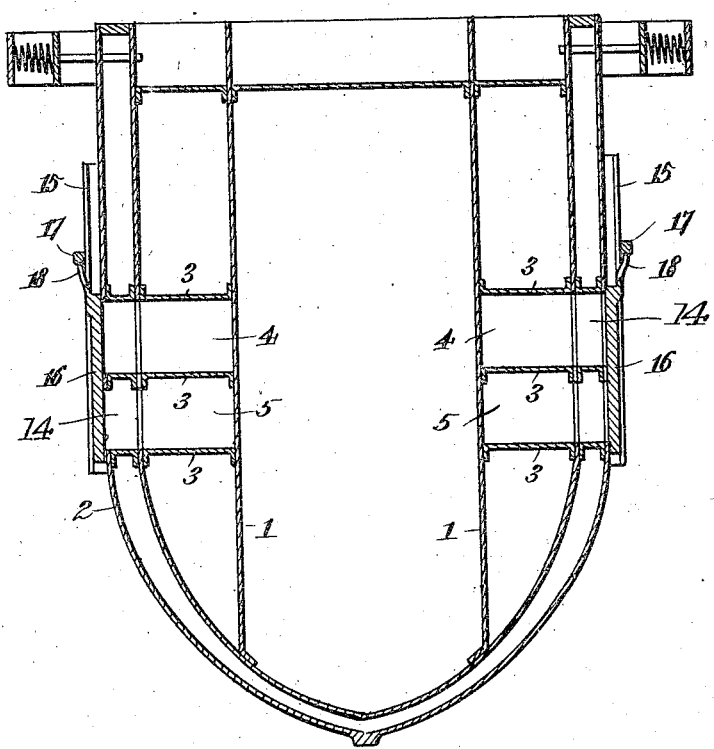

UNITED STATES PATENT OFFICE.

ABRAHAM KAPLAN, OF BROOKLYN, NEW YORK.

SHIP'S BALLASTING APPARATUS.

1,154,515.

Specification of Letters Patent. Patented Sept. 21, 1915.

Application filed April 23, 1915. Serial No. 23,448.

*To all whom it may concern:*

Be it known that I, ABRAHAM KAPLAN, a citizen of the United States, residing at Brooklyn, in the county of Kings and State of New York, have invented new and useful Improvements in Ships' Ballasting Apparatus, of which the following is a specification.

The object of the invention is to provide the hull of the boat with a series of upper compartments normally filled with water and a series of lower compartments permanently filled with air.

A further object of the invention is to provide the upper compartments with doors whereby in case of an inrush of water to one side of the boat, the water loaded compartments on that side of the boat can be relieved of their contents so as to counteract the tendency of the inrushing water to destroy the equilibrium of the boat.

The invention consists in the features of construction, combination, and arrangement of parts, hereinafter fully described and claimed, reference being had to the accompanying drawing, in which:—

Figure 1 is a top plan view of a hull of a boat. Fig. 2 is a horizontal section showing the upper series of compartments. Fig. 3 is a side elevation. Fig. 4 is a transverse vertical section. Figs. 5 and 6 are detail views.

In the drawings, the numeral 1 designates the inner wall of the hull. Inclosing the inner wall 1 and spaced therefrom is an outer wall 2. The space between the inner and outer walls is subdivided by partitions 3 into upper and lower series of compartments 4 and 5, it being understood that any number of series of compartments can be constructed, depending upon the distance between the top of the hull and the keel. The upper series of compartments contains a quantity of water while the lower series of compartments are permanently filled with air. The outer wall 2 is provided with a series of openings 14 that establish communication between the interior of the upper series of compartments and the atmosphere.

Slidably mounted in guides 15 secured to the outer wall 2 are doors 16 whereby the communication between the interior of the compartments and the atmosphere may be cut off. Extending longitudinally with relation to the sides of the outer wall of the hull is a bar 17 that is connected to the doors 16 by links 18.

Secured to the extremities of the bar 17 are vertically disposed rack bars 19 and 20 having their teeth coöperating with the teeth formed upon the shafts 20 and 21 that can be driven by any suitable machinery positioned in the hull of the boat. As shown, the rack bars 19 pass through bearings 22 and 23 so as to be limited to a direct vertical movement.

In case the hull should spring a leak upon one side of the vessel, the upper series of compartments of that side of the vessel are relieved of the water held therein so that the water in the compartments in the opposite side will coöperate with the inrush of water to sustain the equilibrium of the vessel.

Having described the invention what is claimed is:

An improved hull for boats comprising an inner wall, an outer wall, partitions subdividing the space between the walls into upper and lower compartments, doors for establishing communication between the upper compartments and the atmosphere, means for simultaneously operating said doors, said means comprising a longitudinally extending bar having a link connection with each of said doors, and means for moving said bar vertically.

In testimony whereof I affix my signature in presence of two witnesses.

ABRAHAM KAPLAN.

Witnesses:
 JONOS SCHLESING,
 A. ELILICH.